(12) United States Patent
Maasland

(10) Patent No.: US 7,898,828 B2
(45) Date of Patent: Mar. 1, 2011

(54) CHARGER FOR AN INDUSTRIAL TRUCK

(75) Inventor: Hans-Hermann Maasland, Quickborn (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 95 days.

(21) Appl. No.: 11/268,058

(22) Filed: Nov. 7, 2005

(65) Prior Publication Data

US 2006/0097690 A1   May 11, 2006

(30) Foreign Application Priority Data

Nov. 10, 2004   (DE) .................. 10 2004 054 167

(51) Int. Cl.
*H02M 1/14* (2006.01)

(52) U.S. Cl. .................. 363/44; 363/84; 363/89; 363/125

(58) Field of Classification Search .......... 320/111, 320/103; 318/803; 363/44, 46, 84, 89, 125, 363/126
See application file for complete search history.

(56) References Cited

U.S. PATENT DOCUMENTS

| | | | | |
|---|---|---|---|---|
| 4,468,726 A | * | 8/1984 | Daigle et al. ............. | 363/161 |
| 5,341,075 A | | 8/1994 | Cocconi ................... | 318/139 |
| 5,803,215 A | * | 9/1998 | Henze et al. .............. | 191/2 |
| 5,952,812 A | * | 9/1999 | Maeda ..................... | 318/803 |
| 6,282,104 B1 | * | 8/2001 | Kern ........................ | 363/34 |
| 6,741,762 B2 | * | 5/2004 | Grinberg et al. .......... | 385/2 |
| 2005/0046387 A1 | * | 3/2005 | Aker et al. ............... | 320/125 |

FOREIGN PATENT DOCUMENTS

| | | |
|---|---|---|
| EP | 0 593 472 B1 | 4/1995 |
| EP | 0 849 112 A1 | 12/1997 |
| EP | 1 350 664 A2 | 3/2003 |

OTHER PUBLICATIONS

Abstract for JP Publication No. 08214413A, published Aug. 20, 1996.
Abstract for JP Publication 08088908 A, published Apr. 2, 1996.

* cited by examiner

*Primary Examiner*—Bao Q Vu
*Assistant Examiner*—Nguyen Tran
(74) *Attorney, Agent, or Firm*—Vidas, Arrett & Steinkraus

(57) ABSTRACT

Charger for an industrial truck which has an asynchronous machine and a three-phase AC control unit for converting a battery voltage for the asynchronous machine, said charger having a mains power module which applies an AC voltage to one or two motor connection leads via a transformer, the charging current being rectified by half-bridges in the three-phase AC control unit.

8 Claims, 4 Drawing Sheets

CHARGER FOR AN INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a charger for an industrial truck which has an asynchronous machine and a three-phase AC control unit for converting a battery voltage for the asynchronous machine.

From EP 1 350 664 A2 an industrial truck with charging function is known in which no separate charger for recharging the battery is provided, but an electronic control device controls the charging function, too. For this, a separate voltage transformer with an AC/DC transformer is provided, which converts the mains voltage to the low voltage of the battery, the AC/DC transformer corresponding to a complete charger without a printed circuit board for control in doing so.

From EP 0 849 112 A1 a three-phase AC drive arrangement is known, with a battery-supplied, rotation speed variable three-phase machine and a controlled pulse width modulation inverter for the generation of three-phase current AC voltages for the three-phase machine. Further, a charging device for the drive battery is provided, which is supplied by a three-phase current mains and charges the drive battery. This arrangement requires a lavishly designed motor.

From EP 0 593 472 B1, an on-board charger is known, in which two bridge branches of a power inverter are controlled as upward setting controllers in order to apply a DC voltage to a capacitor, and the further bridge branch of the power inverter is controlled as a downward setting controller in order to create a charging current for the traction battery from the capacitor. This device requires a lavishly designed contactor group.

The present invention is based on the objective to provide a charger for the traction battery of an industrial truck which makes it possible to charge the traction battery with simple means.

BRIEF SUMMARY OF THE INVENTION

The charger according to the invention serves for recharging a traction battery in an industrial truck which has an asynchronous machine and a three-phase AC control unit which converts a battery voltage for the asynchronous machine. The charger has a mains power module, preferably realized as an AC/DC transformer, which applies an AC voltage to one or two motor connection leads via a transformer, the charging current being rectified by half-bridges in the three-phase AC control unit. In the charger according to the invention, direct use of the control unit as a secondary rectifier takes place, without that changes of the control unit are required, like additional contactors or the like for instance.

In one possible form of realization, the mains power module has a circuitry for setting the power factor, also designated as a PFC circuit or PFC intermediate circuit. Preferably, but not obligatory, the mains power module has a primary clocked full-bridge, by which the AC voltage from the mains is transformed for rectification through the three-phase AC control unit.

In a convenient form of realization, the transformer in the mains power module will be adjusted to the required magnitude of current in the secondary circuit of the three-phase AC control unit, in order to adapt it to the varying power outputs of the traction battery.

In a preferred form of realization of the charger according to the invention, which will be used at high leakage inductance of the motor, the connection to the motor connection leads takes place such that the inductances in the asynchronous machine are connected in parallel for supply and the mains module is loaded with a small wattless current. Preferably, the two connection leads of the mains power module are each one connected to one of three motor connection leads for this purpose. At the inductances connected in parallel in particular, a capacitor is connected in one of the connection leads of the mains power module, in order to reduce back flowing AC currents of low frequency and to prevent DC currents during the traveling operation, in particular.

In an alternative form of realization, the inductances in the asynchronous machine are serial connected without bypass relay in the charging circuit. For this purpose, the mains power module is connected to the motor connection leads such that at least two inductances in the asynchronous machine are connected in parallel or that they are completely shunted by a relay during the charging operation.

The charger according to the invention may be realized as an on-board charger or as a free-standing charger as well. The on-board charger is integrated into the industrial truck and is connected via a conventional mains cable.

In an alternative form of realization, the charger is realized as a free-standing charger and is preferably connected to a central motor control unit of the industrial truck via an interface.

The assembly of two different chargers will be explained in more detail by means of drawings below. They show:

DETAILED DESCRIPTION OF THE INVENTION

Figure 3:
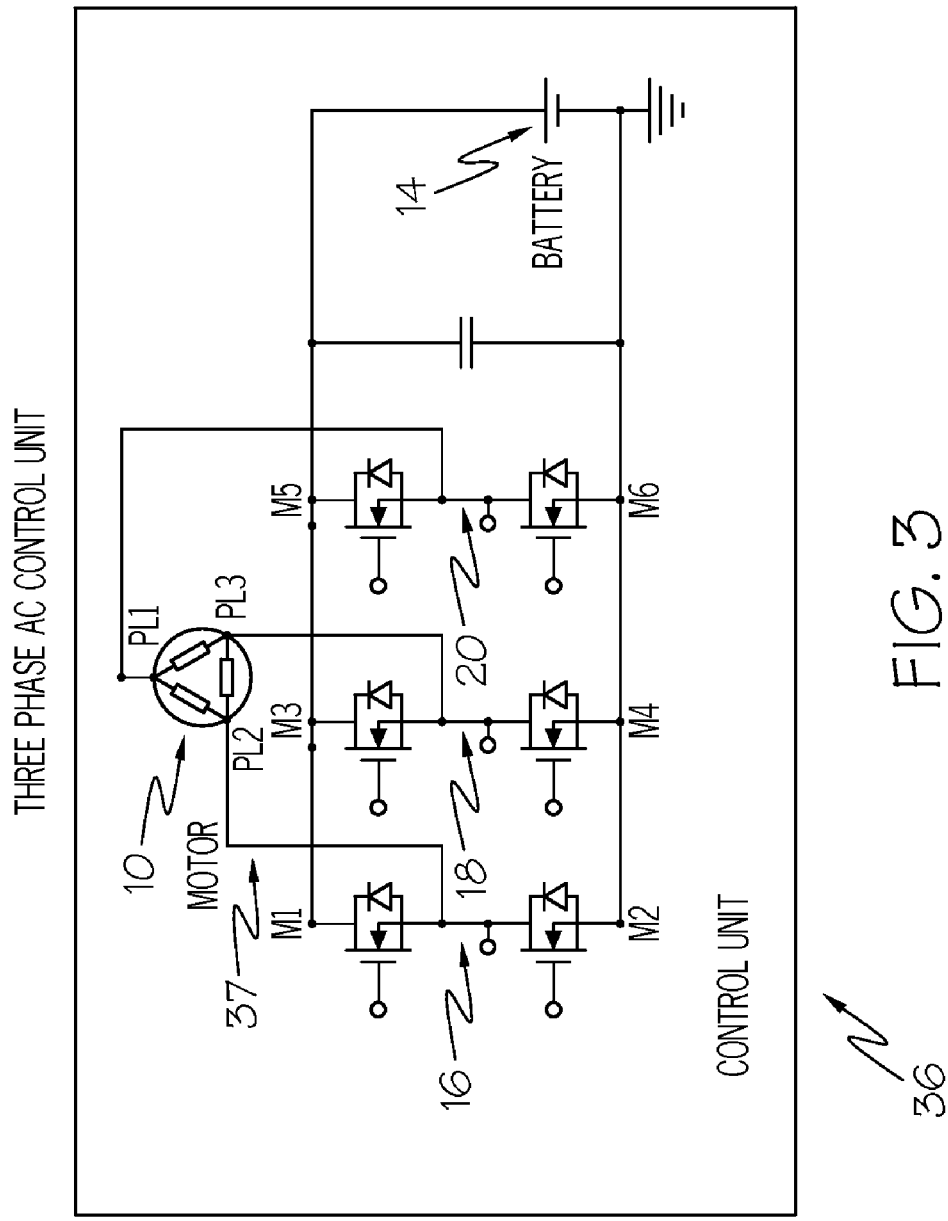
FIG. 3 an elementary circuit diagram for the three-phase AC control unit.

While this invention may be embodied in many different forms, there are described in detail herein a specific preferred embodiment of the invention. This description is an exemplification of the principles of the invention and is not intended to limit the invention to the particular embodiment illustrated FIG. 3 shows an elementary circuit diagram for the three-phase AC control unit with an asynchronous machine 10 in the delta connection. The inverter 12 is fed by a traction battery 14. The power inverter 12 has three bridge branches 16, 18 and 20 which are identically constructed. For the sake of simplicity, only the static converter valves M1 to M6 are represented for each bridge branch, the control circuitry thereof not being represented, however. The static converter valves are disconnectable power semiconductors, MOSFET transistors with freewheeling diode or insulated gate turn off transistors (IGBTs) with internal freewheeling diode may be used, e.g. By interposing the static converter valves M1 to M6, the present DC voltage V1 of the traction battery is converted into the desired three phase AC current for the asynchronous machine 10, in order to drive the industrial truck with a predetermined desired value for the rotation speed.

Figure 1:
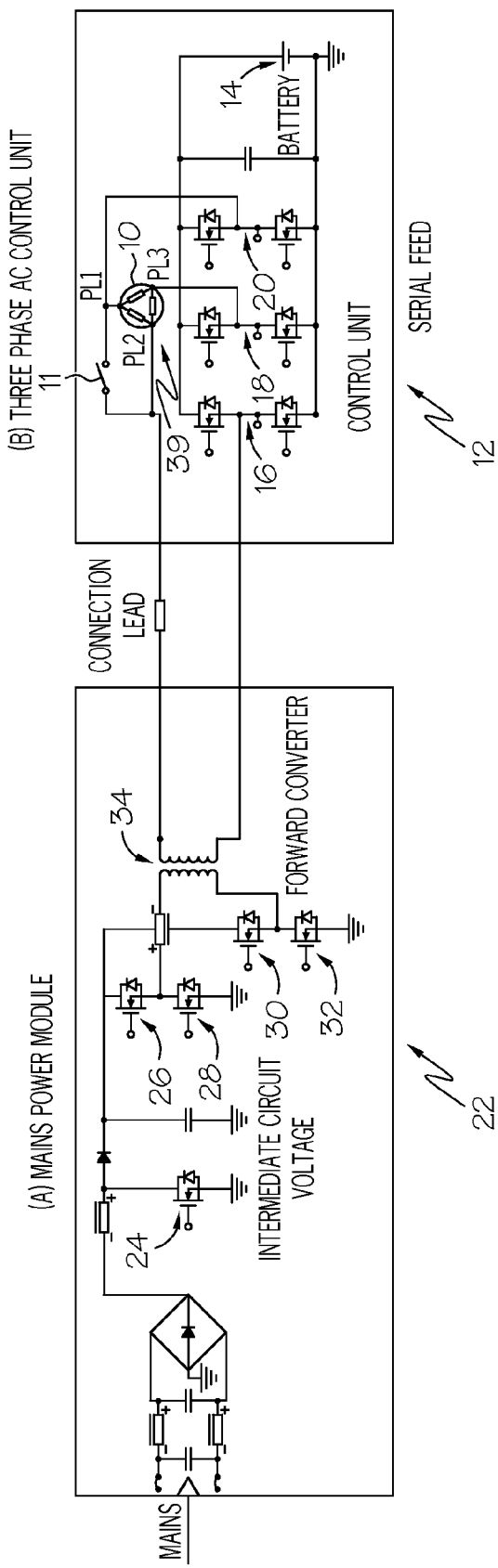
FIG. 1 an elementary circuit diagram for a mains power module, which is serial connected to the asynchronous machine.

FIG. 1 shows a mains power module according to the invention which is provided for serial connection to the inductances of the asynchronous machine 10. The mains power module 22 has a power factor control circuitry 24, which prevents perturbation of the electric mains. Further, the mains power module 22 has a bridge, which is itself again equipped with static converter valves 26, 28, 30, 32. The diagonal terminals of the bridge are connected to a transformer 34 on the primary side. On the secondary side, the two connection leads of the transformer 34 are connected with a first bridge branch 16 of the three-phase AC current control unit. The second connection lead of the transformer 34 lays on the terminal PL2 of the asynchronous machine 10, so that the corresponding inductance is serially connected. An additional relay 11 may shunt the asynchronous machine for direct feeding into the three-phase AC current bridge 20.

The circuit arrangement represented in FIG. 1 is applied in the case that the leakage inductance of the asynchronous machine does not exceed a predetermined value. Here, the motor substitutes a filter choke for smoothing in the serial connection and forms a bridge for feeding into the three-phase AC current control unit, and thus into the battery, during the charging operation. The AC current from the mains power module laying on the asynchronous machine at Phase L1 and L2, for instance, has a frequency of around 150 kHz, so that no torque is generated on the motor. Instead, the motor inductance is used as a choke inductance in the secondary circuit, and thus it enables to provide a charging current.

Figure 2:
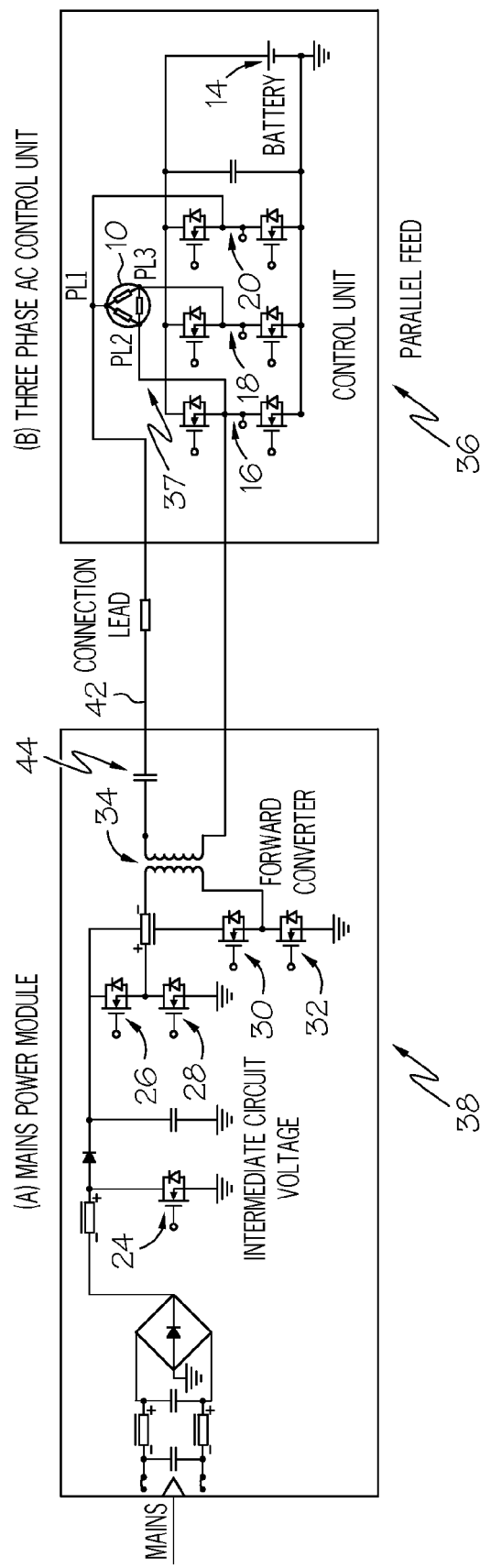
FIG. 2 a mains power module, which is parallel connected to the asynchronous machine.

FIG. 2 shows a parallel connection of the inductances in the charging circuit. This possibility is preferably used in the case that the leaking inductance of the motor is above a certain limit. A large leakage inductance of the motor is frequently occurring in asynchronous motors for industrial trucks. In this connection, a high frequency AC current with a frequency of around 150 kHz is applied parallel to the winding, the three-phase AC bridges 16 and 20 generating the required charging current from it. In the motor, a small wattless current is flowing, which means only a small additional expense for the construction. With the power factor control and the bridge circuit, the mains power module 38 provided for the parallel connection essentially corresponds to the construction of the mains power module described above. The connection lead 42 is provided with a capacitor 44 to prevent any AC portion from the three-phase AC control unit which is operated at 16 kHz, e.g., or to prevent any DC portion, respectively. As an alternative to capacitor 44, powering down via an automobile relay or a semiconductor relay may be performed in the traveling operation. The back current during traveling operation is very low, due to the significantly smaller frequency on the three-phase AC control unit. The secondary winding of the transformer is provided for different voltage adaptions, for 24 V and 48 V e.g. The three-phase AC control unit 36 is provided for parallel supply, the three-phase AC bridge 16 being connected to the terminal PL2 of motor 10 via a lead. In the parallel operation, the capacitor 44 or a single-pole disconnect relay is required to prevent back feeding from the three-phase AC traveling operation. In the serial supply from FIG. 1, the connection of PL2 takes place via connection lead 36 together with terminal PL1. In the serial supply, the relay 11 for shunting the motor winding is obligatory. It may be omitted only in motors with very low series inductance. FIG. 3 shows the three-phase AC control unit 36 as a (synchronous-) rectifier from FIG. 2 for parallel supply.

Figure 4:
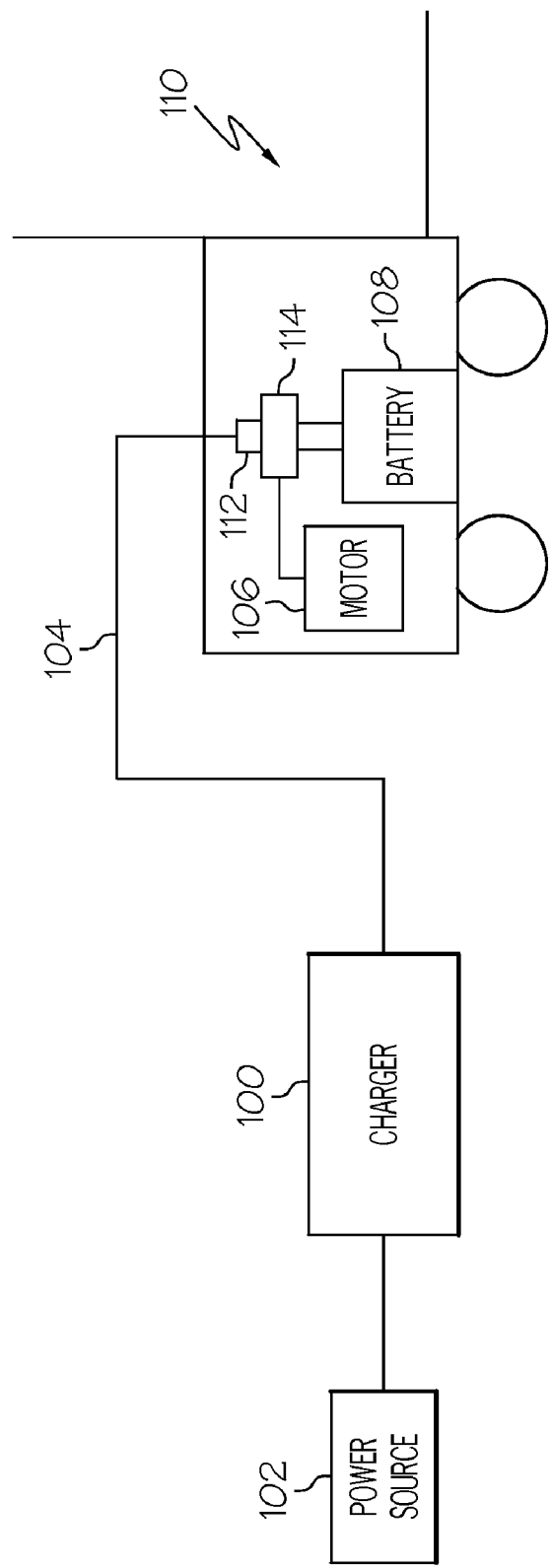
FIG. 4 an elementary circuit diagram of a free-standing charger connected to a central motor control unit of the industrial truck via an interface.

FIG. 4 shows a free standing charger 100, connected to a power source 102. The charger 100 is connected via connecting leads 104 to an interface 112 of the central motor control 114. The central motor control 114 is connected to the battery 108 and the motor 106 of the floortruck 110.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Charger for an industrial truck which has an asynchronous machine and a three-phase AC control unit for converting a battery voltage for the asynchronous machine, said charger having a mains power module with two connecting leads, each connecting lead being connected to a motor connection lead, wherein the mains power module applies an AC voltage to at least one motor connection lead via a transformer, wherein a charging current is rectified by half-bridges in the three-phase AC control unit, and wherein a high frequency AC current of around 150 kHz is applied parallel to the windings of an asynchronous machine, and wherein a capacitor is provided in one of the connecting leads.

2. Charger according to claim 1, characterized in that a high-frequency AC voltage is generated by the mains power module as an AC voltage.

3. Charger according to claim 1, characterized in that the mains power module has a circuitry for setting a power factor.

4. Charger according to claim 1, characterized in that the mains power module has a primary clocked full-bridge or a symmetrical half-bridge.

5. Charger according to claim 1, characterized in that the mains power module is connected to the motor connection lead, such that inductances in the asynchronous machine are connected in parallel.

6. Charger according to claim 1, characterized in that the mains power module is connected to the motor connection lead, such that at least two inductances of the asynchronous machine are connected in parallel.

7. Charger according to claim 1, characterized in that the charger is integrated into the industrial truck.

8. Charger according to claim 1, characterized in that the charger is realized as a free-standing charger and is connected to a central motor control unit via an interface.

\* \* \* \* \*